United States Patent
Borda et al.

(10) Patent No.: US 9,128,881 B2
(45) Date of Patent: *Sep. 8, 2015

(54) RECOVERY FOR LONG RUNNING MULTITHREADED PROCESSES

(71) Applicant: International Business Machines Corporation, Armonk, NY (US)

(72) Inventors: Hernando Borda, Auburn, MA (US); Ravindra Medikonduru, Westford, MA (US); Valeria Pechorin, Brighton, MA (US); Brian L. Tinnel, Northbridge, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/221,549

(22) Filed: Mar. 21, 2014

(65) Prior Publication Data

US 2014/0207738 A1    Jul. 24, 2014

Related U.S. Application Data (63) Continuation of application No. 13/710,181, filed on Dec. 10, 2012.

(51) Int. Cl.
*G06F 11/00* (2006.01)
*G06F 11/14* (2006.01)
*G06F 11/07* (2006.01)
(Continued)

(52) U.S. Cl.
CPC ............ *G06F 11/1446* (2013.01); *G06F 9/461* (2013.01); *G06F 9/485* (2013.01); *G06F 9/4856* (2013.01); *G06F 9/5088* (2013.01);
(Continued)

(58) Field of Classification Search
CPC ............ G06F 11/0715; G06F 11/1402; G06F 11/1407; G06F 9/461; G06F 9/485; G06F 9/4856; G06F 9/4881; G06F 9/5088; G06F 9/52; G06F 11/0793; G06F 11/1446
USPC .......................................... 714/13, 15, 16, 19
See application file for complete search history.

(56) References Cited

U.S. PATENT DOCUMENTS 6,338,147 B1 * 1/2002 Meth et al. ...................... 714/13
7,305,582 B1 * 12/2007 Moser et al. .................... 714/13
(Continued)

OTHER PUBLICATIONS

B. Gupta and S. Rahimi. 2009. A novel low-overhead recovery approach for distributed systems. J. Comp. Sys., Netw., and Comm. 2009, Article 3 (Jan. 2009), 8 pages. DOI=10.1155/2009/409873 http://dx.doi.org/10.1155/2009/409873.*

(Continued)

*Primary Examiner* — Bryce Bonzo
*Assistant Examiner* — Anthony J Amoroso
(74) *Attorney, Agent, or Firm* — Janaki K. Davda; Konrad, Raynes, Davda & Victor LLP (57) ABSTRACT

In response to receiving a checkpoint request from a first task for a process executing in parallel with at least a second task for the process, checkpoint data from the first task is stored to establish a restart point for the first task, wherein the checkpoint data records a current state of the first task, and the checkpoint data from the first task is merged with previously received checkpoint data for the at least second task to create a checkpoint file. In response to restarting the process, the first task and the at least second task are restarted using the checkpoint data in the checkpoint file.

8 Claims, 8 Drawing Sheets

(51) Int. Cl.
*G06F 9/48* (2006.01)
*G06F 9/46* (2006.01)
*G06F 9/50* (2006.01)

(52) U.S. Cl.
CPC ........ *G06F11/0715* (2013.01); *G06F 11/0793* (2013.01); *G06F 11/1407* (2013.01)

(56) References Cited

U.S. PATENT DOCUMENTS

| | | | |
|---|---|---|---|
| 8,549,532 B2* | 10/2013 | Ganesh | 718/105 |
| 2002/0103814 A1 | 8/2002 | Duvillier et al. | |
| 2006/0041602 A1 | 2/2006 | Lomet et al. | |
| 2010/0185840 A1 | 7/2010 | Duffy et al. | |

OTHER PUBLICATIONS

Qiangfeng Jiang, Yi Luo, and D. Manivannan. 2008. An optimistic checkpointing and message logging approach for consistent global checkpoint collection in distributed systems. J. Parallel Distrib. Comput. 68, 12 (Dec. 2008), 1575-1589. DOI=10.1016/j.jpdc.2008.08.003 http://dx.doi.org/10.1016/j.jpdc.2008.08.003.*

B. Gupta and S. Rahimi. 2009. A novel low-overhead recovery approach for distributed systems. J. Comp. Sys., Netw., and Comm. 2009, Article 3 (Jan. 2009), 8 pages.*

Qiangfeng Jiang, Yi Luo, and D. Manivannan. 2008. An optimistic checkpointing and message logging approach for consistent global checkpoint collection in distributed systems. J. Parallel Distrib. Comput. 68, 12 (Dec. 2008), 1575-1589.*

Vignola, C., "Introduction to Batch Programming Using WebSphere Extended Deployment Compute Grid", Jan. 23, 2008, [online], [Retrieved on Jun. 27, 2012]. Retrieved from the Internet at <URL: http://www.ibm.com/developerworks/websphere/techjournal/0801_vignola.html>, Total 10 pp.

Office Action 1, Aug. 29, 2014, for U.S. Appl. No. 13/710,181, filed Dec. 10, 2012 by H. Borda et al., Total 24 pp. [57.302 (OA1)].

Response to Office Action 1, Nov. 26, 2014, for U.S. Appl. No. 13/710,181, filed Dec. 10, 2012 by H. Borda et al., Total 15 pp. [57.302 (ROA1)].

Final Office Action, Jan. 15, 2015, for U.S. Appl. No. 13/710,181, filed Dec. 10, 2012 by H. Borda et al., Total 24 pp. [57.302 (FOA)].

Response to Final Office Action, Apr. 6, 2015, for U.S. Appl. No. 13/710,181, filed Dec. 10, 2012 by H. Borda et al., Total 13 pp. [57.302 (RFOA)].

Gupta, B., S. Rahimi, and Y. Yang, "A Novel Roll-Back Mechanism for Performance Enhancement of Asynchronous Checkpointing and Recovery", Received May 26, 2006, Informatica 31 (2007), retrieved from the Internet at <URL: http://www.informatica.si/PDF/31-1/11_Gupta-A%20Novell%20Roll-Back . . . pdf>, Total 14 pp.

"Crash Recovery", [online], [Retrieved on Jun. 28, 2012]. Retrieved from the Internet at <URL: http://publib.boulder.ibm.com/infocenter/db2luw/v8/index.jsp?topic=/com.ibm.db2.udb.doc/admin/c0005962.htm>, Total 2 pp.

Kimball, R., M. Ross, W. Thornthwaite, J. Mundy, and B. Becker, "The Data Warehouse Lifecycle Toolkit", Second Edition, Wiley Publishing, Inc., © 2008, (also: available from the Internet at <URL: http://books.google.com/books?id=wKPfaByTzGgC&pg=PA409&lpg=PA409&dq=crash+recovery+ET>), Total 5 pp.

"Recovery Principles", [online], [Retrieved on Jun. 28, 2012]. Retrieved from the Internet at <URL: http://docs.oracle.com/cd/B10500_01/server.920/a96519/recov.htm>, Total 9 pp.

Vignola, C., "Introduction to Batch Programming Using WebSphere Extended Deployment Compute Grid", Jan. 23, 2008, [online], [Retrieved on Jun. 27, 2012]. Retrieved from the Internet at <URL: http://www.ibm.com/developerworks/websphere/techjournal/0801_13 vignola/0801_vignola.html>, Total 10 pp.

U.S. Patent Application with U.S. Appl. No. 13/710,181, filed Dec. 10, 2012, entitled "Recovery for Long Running Multithreaded Processes", invented by Borda, H. R. Medikonduru, V. Pechorin, and B.L. Tinnel, Total 28 pp. [57.302 (Appln)].

Notice of Allowance, May 5, 2015, for U.S. Appl. No. 13/710,181, filed Dec. 10, 2012 by H. Borda et al., Total 8 pp. [57.302 (NOA)].

* cited by examiner

RECOVERY FOR LONG RUNNING MULTITHREADED PROCESSES

FIELD

Embodiments of the invention relate to recovery for long running multithreaded processes (e.g., after a crash or suspension of the process).

BACKGROUND

A long running process, such as a product migration or Extract, Transform, and Load (ETL) process may crash (i.e., fail). When such a crash occurs, the user typically starts the long running process again from the beginning of the process in a single threaded fashion.

SUMMARY

Provided are a computer implemented method, computer program product, and system for recovery of a process. In response to receiving a checkpoint request from a first task for a process executing in parallel with at least a second task for the process, checkpoint data from the first task to establish a restart point for the first task is stored, wherein the checkpoint data records a current state of the first task, and the checkpoint data from the first task is merged with previously received checkpoint data for the at least second task to create a checkpoint file. In response to restarting the process, the first task and the at least second task are restarted using the checkpoint data in the checkpoint file.

BRIEF DESCRIPTION OF THE SEVERAL VIEWS OF THE DRAWINGS

In the drawings, like reference numbers represent corresponding parts throughout.

FIG. 3 illustrates, in a flow diagram, operations for processing checkpoints and restart operations. FIG. 3 is formed by FIGS. 3A, 3B, 3C, and 3D.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
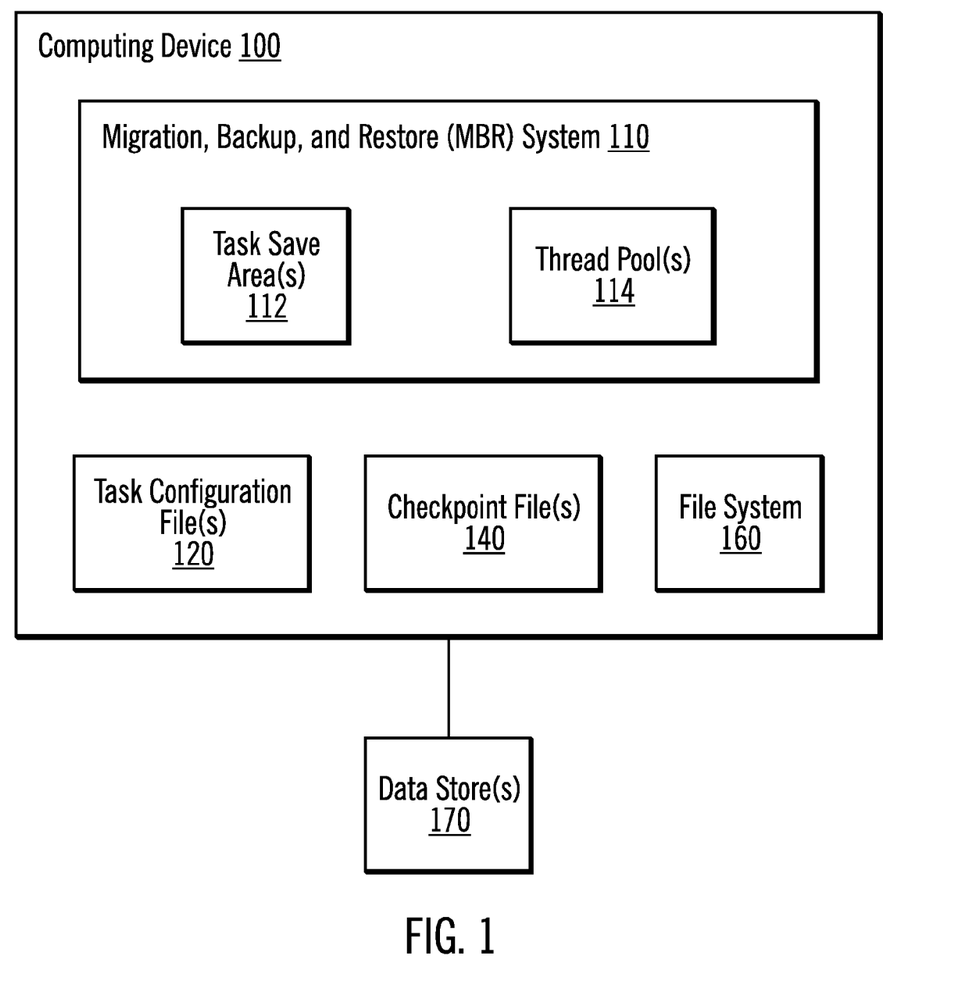
FIG. 1 illustrates, in a block diagram, a computing environment in accordance with certain embodiments.

FIG. 1 illustrates, in a block diagram, a computing environment in accordance with certain embodiments. A computing device 100 is coupled to one or more data stores 170. The computing device 100 includes a Migration, Backup, and Restore (MBR) system 110, one or more task configuration files 120, one or more checkpoint files 140, and a file system 160. Each of the data stores 170 stores data. The MBR system 110 uses internal structures for one or more task save areas 112 and one or more thread pools 114.

A migration operation may be described as moving or copying data (which may include instructions) from a source system to a target system. (A backup operation may be described as creating a backup image of an application's data on a source system. A restore operation may be described as taking a previously created backup image and using that backup image to reproduce the source system application's data on a target system.) For example, migration may be a process in which a backup is performed on a source system running an old version of an application (e.g., Version 8.0) and the resulting backup image is restored to a target system running a newer version of the application (e.g., Version 9.1). The resulting restored data on the target system may then be manipulated to ensure that it conforms to what the newer version expects. Migration, backup, and restore operations, as well as an ETL process, may be long running processes. In certain embodiments, the source system may be a first data store 170, and the target system may be a second data store 170. In certain alternative embodiments, the source system and the target system may be on a single data store 170.

If a crash or suspension of the process occurs at some point, the MBR system 110 allows the user to restart tasks for the long running process at restart points before the crash or suspension (which may include a restart point at the beginning of the long running process). The long running process may have fired off multiple threads of execution, and the MBR system 110 restarts each of the multiple threads.

The MBR system 110 records information about a current state of a task. For example, a task might have 10 actions to perform, and after each action, the task does whatever is needed to commit the updates made by that action. The task then takes a checkpoint (to establish a restart point) to indicate that one action (action x) is finished and proceeds to the next action (action x+1). In certain embodiments, the checkpoint data may be an integer holding the identifier of the action that just finished. Then, if a crash occurs, the MBR system 110 loads the checkpoint data, recreates the task (e.g., via JAVA™ serialization, JAVA is a registered trademark or common law mark of Oracle Corporation in the United States and/or other countries), and calls a restart operation on the task so that the task can continue processing where the task left off before the crash or suspension.

Thus, the MBR system 110 may not roll back any unfinished updates when a failure occurs. Instead, the MBR system 110 deals with multiple threads, each taking individual checkpoints and having different restart points. This may be done by allowing each of the multiple threads to save a restart point, which may include merging the restart points from each of the multiple threads into a single checkpoint file 140 (e.g., a single checkpoint image).

In certain embodiments, the task save areas 112 store the checkpoint data for tasks during processing. When a thread takes a checkpoint, the thread is processing a task and the thread saves the checkpoint data for the task, where saving the checkpoint is done by storing the checkpoint data in the task save area 112.

Figure 2:
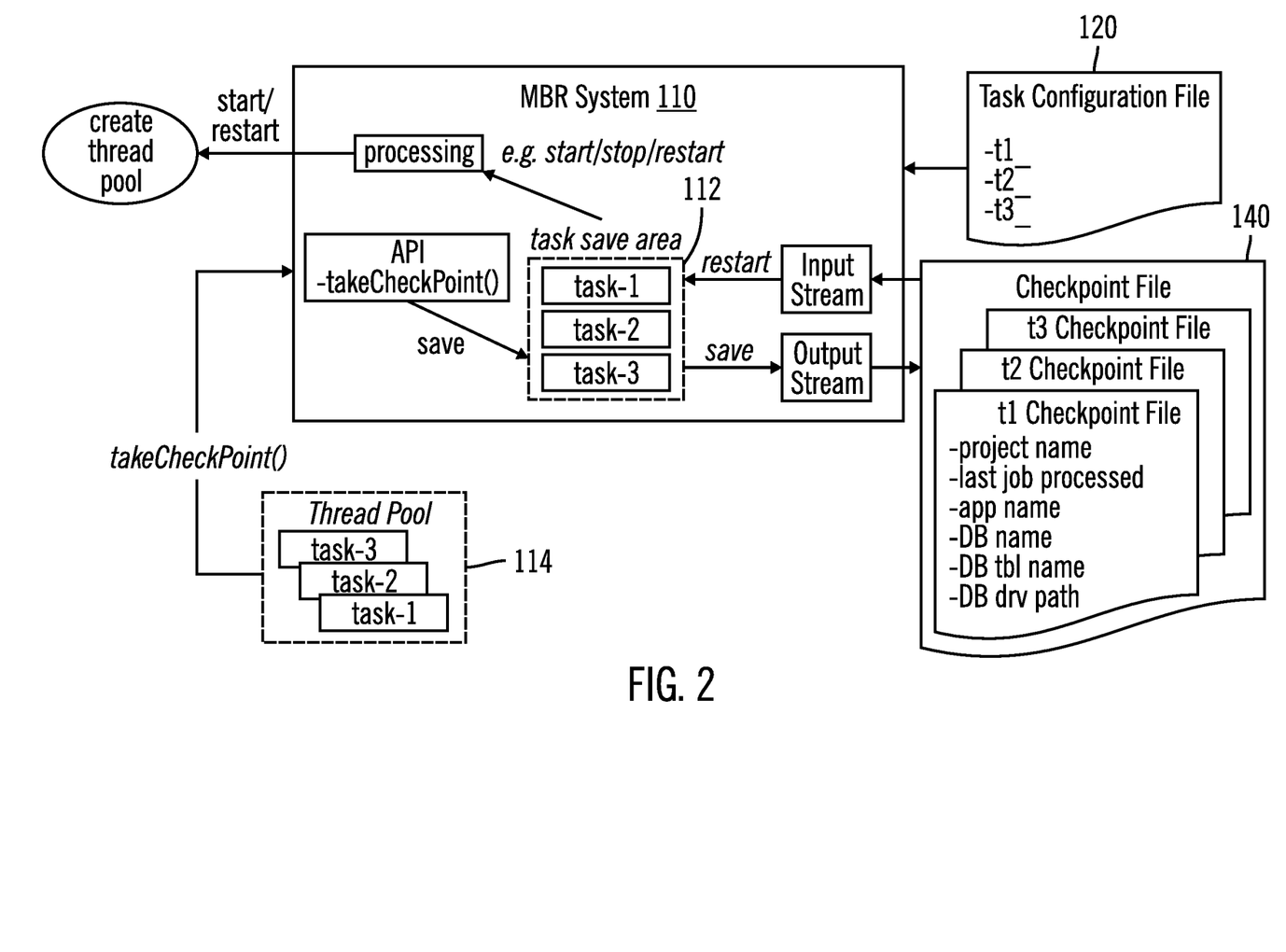
FIG. 2 illustrates, in a block diagram, details of a Migration, Backup, and Restore (MBR) system in accordance with certain embodiments.

FIG. 2 illustrates, in a block diagram, details of a Migration, Backup, and Restore (MBR) system in accordance with certain embodiments. In FIG. 2, the MBR system 110 receives a task configuration file 120 and creates a task save area 112 for each task identified in the task configuration file 120. In certain embodiments, a takeCheckPoint Application Programming Interface (API) call is received from a task in the thread pool 114 to request a checkpoint. Then, the MBR system saves checkpoint data for that task in the task save area 112. The checkpoint data in the task save area for multiple tasks may be output to a single checkpoint file 140. For a restart operation, the MBR system 110 retrieves the checkpoint data from the checkpoint file 140 and restarts each of the tasks at the last checkpoint saved for that task.

In certain embodiments, the MBR system 110 creates individual task objects for each task that is to be performed. A task object may be described as an internal representation of a task that will be run within the MBR system 110. In certain embodiments, each task object consists of the code needed to import, export, backup or restore a portion of the information server environment.

In certain embodiments, the tasks are executing in parallel. As each task executes, the task is able to take one or more checkpoints to establish a restart point. As checkpoints are taken, the checkpoints from multiple tasks may be merged into a process wide checkpoint file 140, along with other process level information. The MBR system 110 manages the checkpoint and recovery process.

In certain embodiments, during a restart, each task is recovered to the last checkpoint that task took and continues processing from that point. In certain embodiments, the checkpoint file 140 contains serialized task objects for each task that has been registered to run and that is running In certain embodiments, the task objects contain the checkpoint data. Examples of checkpoint data are:

Project Name
Last Job Processed Identifier
Application Name
Database Name
Database Table Name
Database Driver Path FIG. 3 illustrates, in a flow diagram, operations for processing checkpoints and restart operations. FIG. 3 is formed by FIGS. 3A, 3B, 3C, and 3D. Control begins at block 300 with the MBR system 110 starting. In block 302, the MBR system 110 reads a task configuration file 120 (e.g., from a file system 160). In certain embodiments, reading the task configuration file 120 includes retrieving the task configuration file 120. In block 304, the MBR system 110 creates a task save area 112 for each task identified in the task configuration file 120.

Figure 3A:
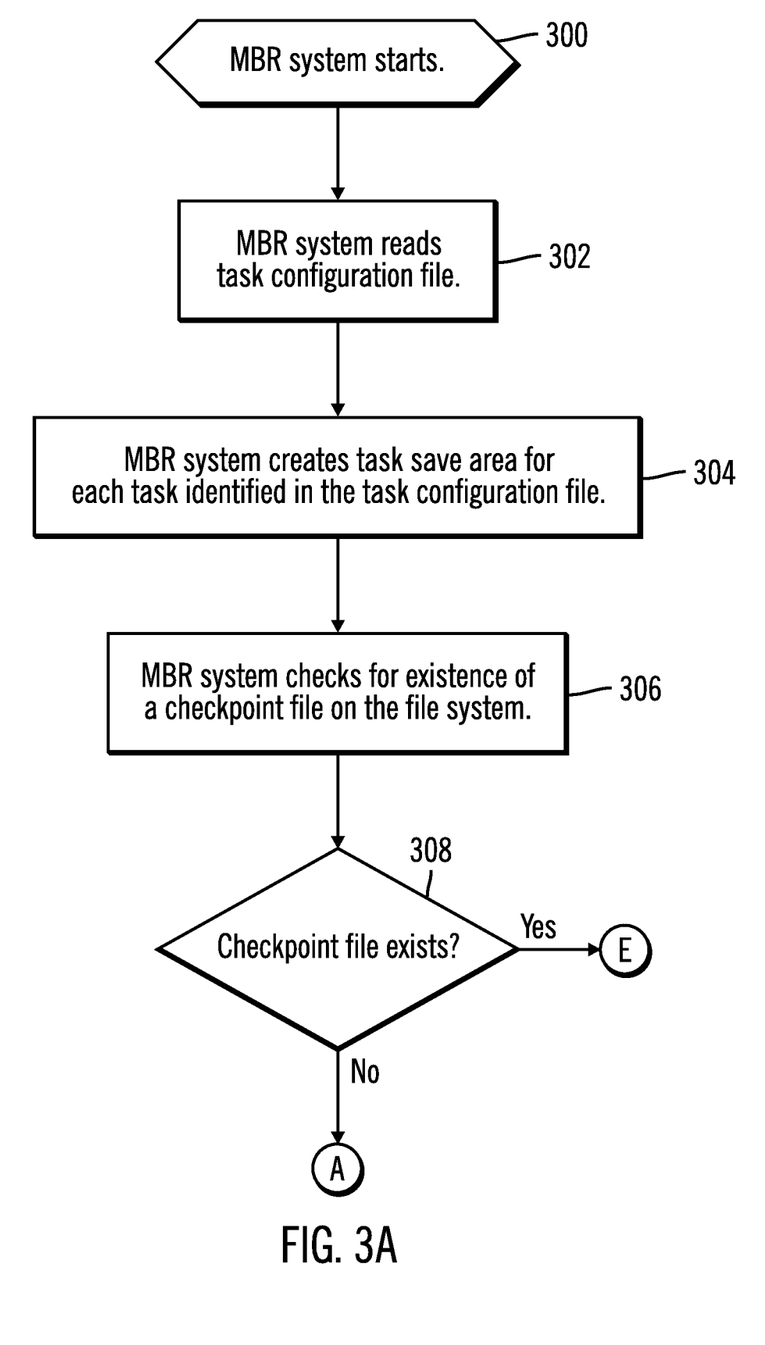
Figure 3B:
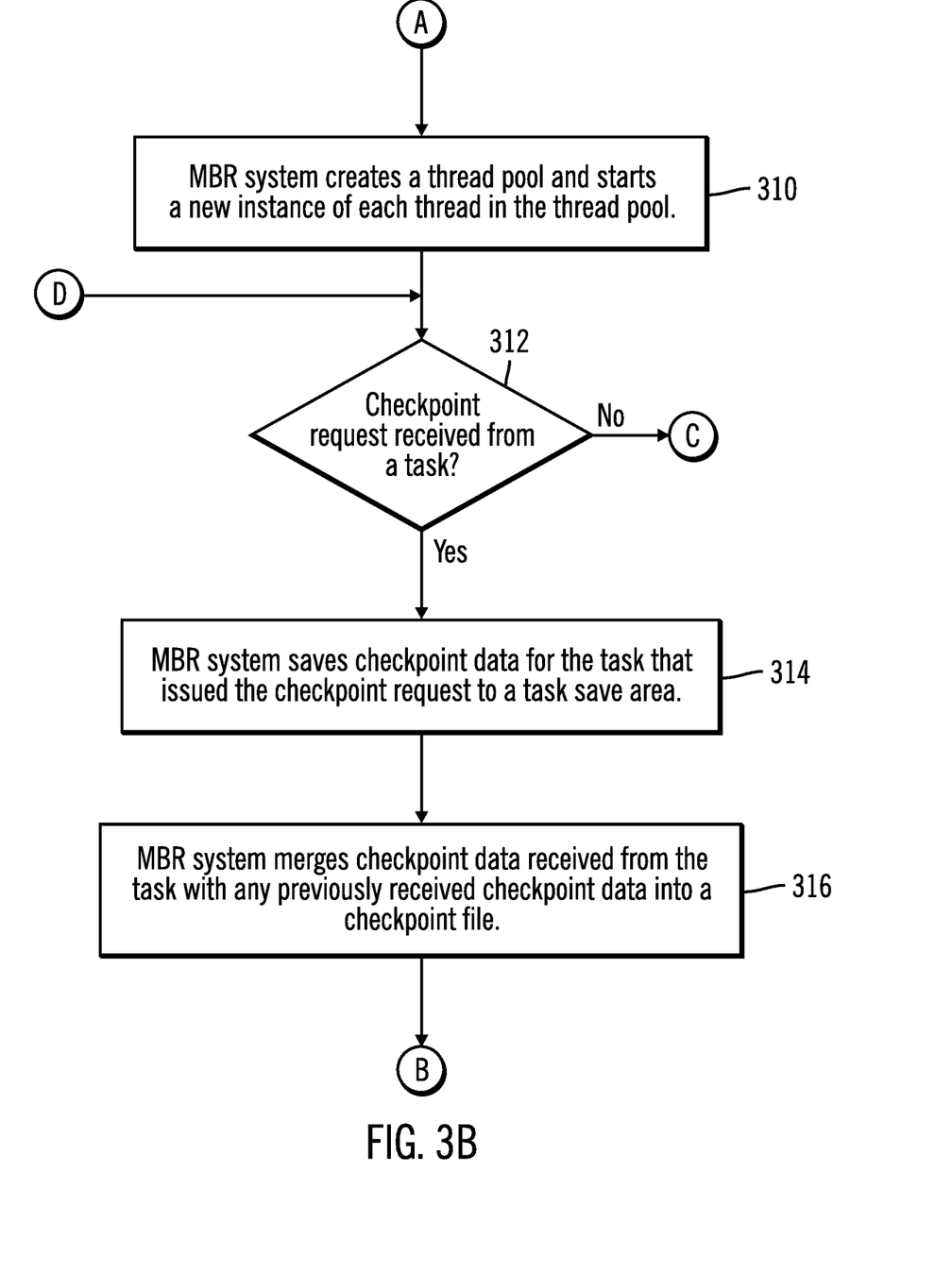
Figure 3C:
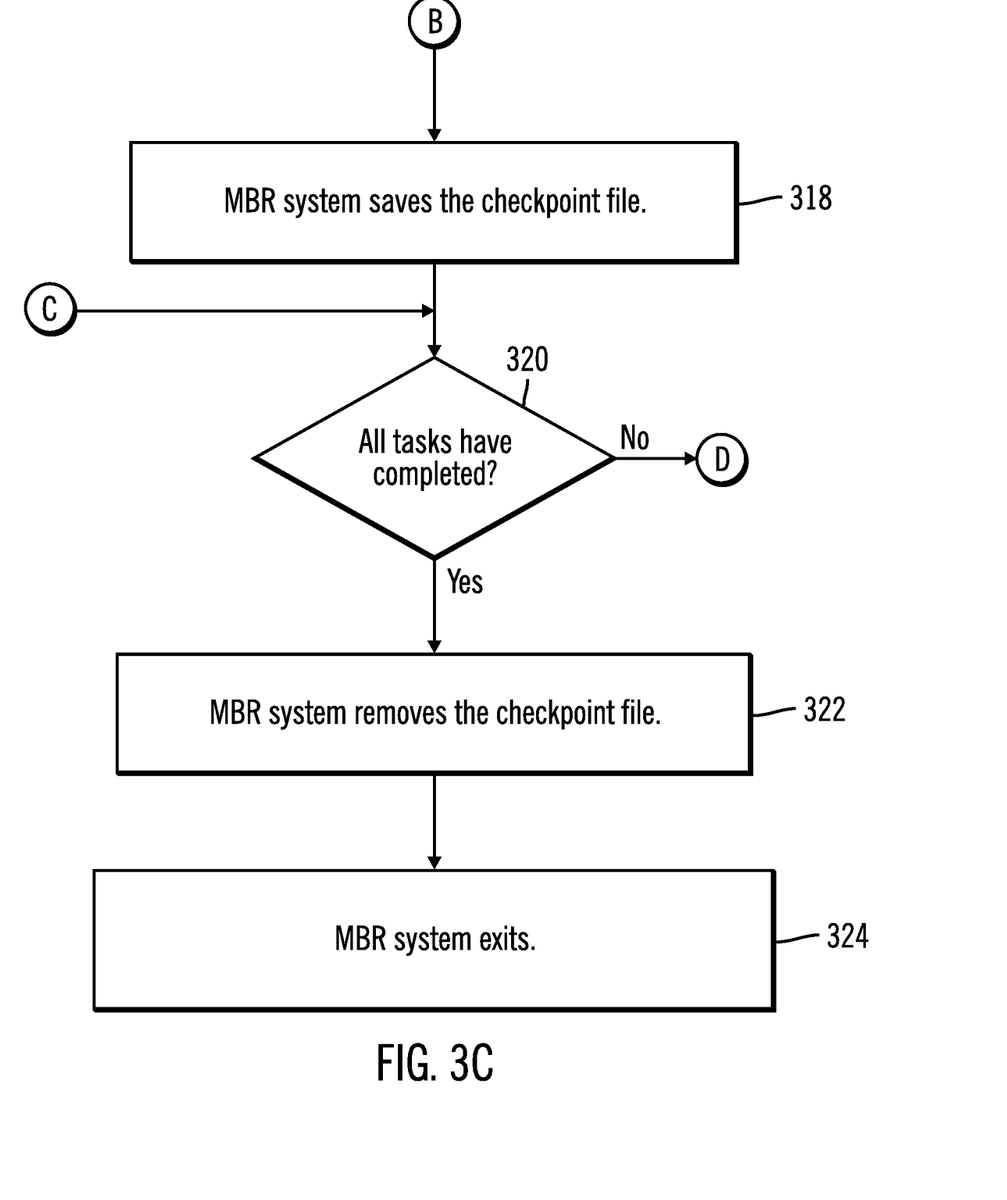
Figure 3D:
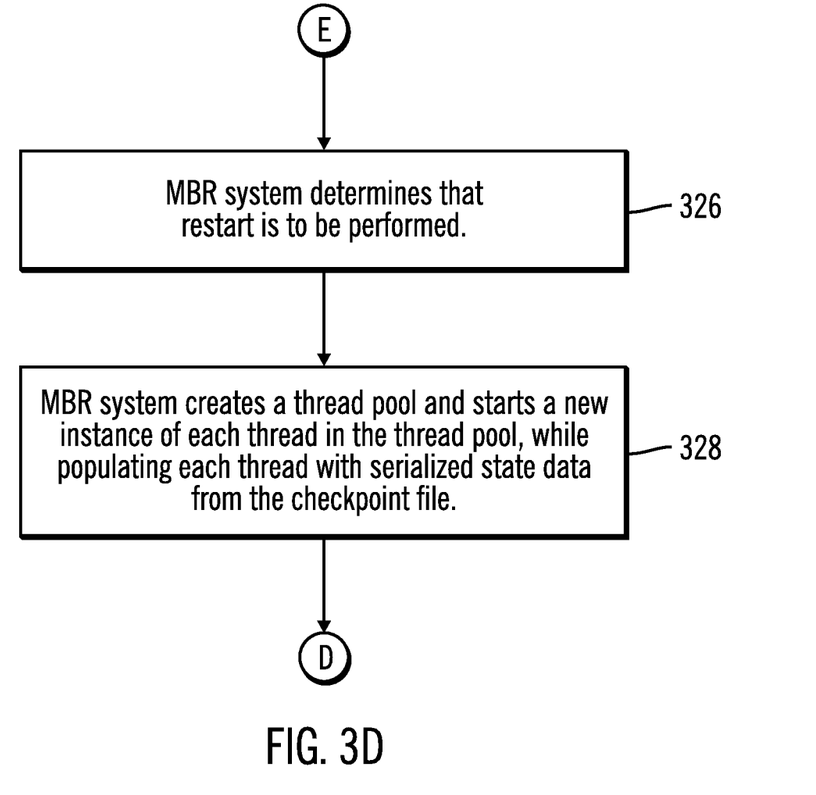

In block 306, the MBR system 110 checks for the existence of a checkpoint file 140 (e.g., on the file system 160). In block 308 (FIG. 3A), if a checkpoint file 140 does not exist, processing continues to block 310 (FIG. 3B), otherwise, processing continues to block 326 (FIG. 3D).

In block 310, the MBR system 110 creates a thread pool 114 with threads and starts a new instance of each thread in the thread pool 114. In certain embodiments, the number of threads created depends on external aspects of the computing device 100 on which the process is running For example, the number of Central Processing Units (CPUs) and the amount of memory may be taken into consideration in deciding how many threads to create. Once the threads are created, the threads cooperate in selecting tasks that are available to be run from the entire set of defined tasks. In certain embodiments, each thread executes the code for a single task at any one time. After a task has completed, the thread may obtain another task to run. This continues until no more tasks are available to run.

In block 312, the MBR system 110 determines whether a checkpoint request has been received from a task. If so, processing continues to block 314, otherwise, processing continues to block 320 (FIG. 3C). In certain embodiments, the task issues a checkpoint by calling a takeCheckPoint API provided by the MBR system 110.

In block 314, the MBR system 110 saves checkpoint data for the task that issued the checkpoint request to a task save area 112. In certain embodiments, saving the checkpoint data triggers saving of the checkpoint file 140.

In block 316, the MBR system 110 merges checkpoint data received from the task with any previously received checkpoint data (from the same and/or other tasks) into a checkpoint file 140. In certain embodiments, the MBR system 110 serializes the checkpoint data from multiple tasks into a single checkpoint file 140. Serializing data refers to taking an internal structure and converting that internal structure to a form that may be stored outside of the application (e.g., to a file). From block 316 (FIG. 3B), processing continues to block 318 (FIG. 3C).

In block 318, the MBR system 110 saves the checkpoint file 140 (i.e., writes the checkpoint file 140 to the file system 160). In block 320, the MBR system 110 determines whether all tasks have completed processing. If so, processing continues to block 322, otherwise, processing continues to block 312 (FIG. 3B). If all tasks have completed, in block 322, the MBR system 110 removes the checkpoint file 140. In block 324, the MBR system 110 exits.

When the MBR system 110 starts up and determines that the checkpoint file exists (block 308 (FIG. 3A)), then, in block 326, the MBR system 110 determines that a restart operation is to be performed. A restart operation restarts each task from a last checkpoint for that task. In block 328, the MBR system 110 creates a thread pool 114 and starts a new instance of each thread in the thread pool 114, while populating each thread with serialized state data from the checkpoint file 140.

Figure 4:
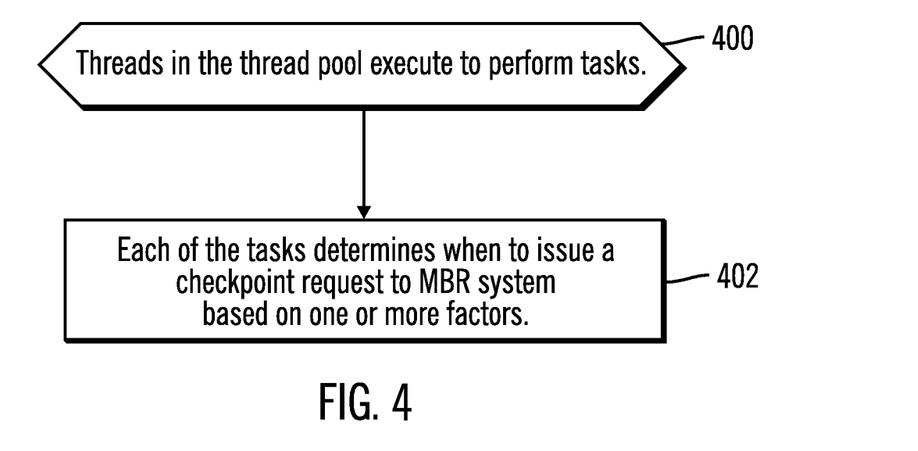
FIG. 4 illustrates, in a flow diagram, processing performed by a task in accordance with certain embodiments.

FIG. 4 illustrates, in a flow diagram, processing performed by a task in accordance with certain embodiments. Control begins at block 400 with threads in the thread pool 114 executing to perform tasks. In certain embodiments, instantiation of the threads (as in block 310 or block 328) causes execution of the threads. In block 302, each of the tasks determines when to issue a checkpoint request to the MBR system 110 based on one or more factors. In certain embodiments a task calls the takeCheckPoint API to issue the checkpoint request. In certain embodiments, each task determines when to issue the checkpoint request based on individual needs of that task, such as whether an action may be long running (e.g., copying a large number of files to temporary storage).

The MBR system 110 allows for recovery for long running, multi-threaded processes. In certain embodiments, the long running process may be a migration operation, a backup operation, a restore operation, or an ETL process. In certain embodiments, in the long running process, a task may take a series of checkpoints. The checkpoint contains state information to resume the process at that checkpoint. The checkpoint may be saved as a serialized object that includes metadata.

In certain embodiments, the user may resume operation of the long running process after a crash occurs using the checkpoints. In certain embodiments, the checkpoints from the task may be merged together into a single checkpoint file. In certain embodiments, during a restart, each task is recovered to the last checkpoint taken and continues from that point on. In certain embodiments, the long running process may fire off multiple threads of execution for the different tasks. In certain embodiments, the act of saving and resuming checkpoints is thread-safe. Saving and resuming checkpoints may be said to be thread safe if multiple threads attempt to save a checkpoint at the same time and they do not cause conflicts within the MBR system 110. In addition, during restart, multiple threads do not attempt to restore the previous state of the same task.

Long running processes may run up to a certain point, fail, and then be resumed after the problem causing the failure is resolved. The MBR system 110 allows users to fix problems that cause the long running process to fail, while resuming the execution as each problem is resolved.

Thus, the MBR system 110, for long running processes, allows separate checkpoints for each of multiple threads of execution and merges the checkpoints into a single checkpoint file. The MBR system 110 allows for better performance without sacrificing the ability to resume a long running process that has failed.

When recovering from a crash or a planned suspension, the MBR system 110 resumes the execution of a multi-threaded long running process based on checkpoints taken by parallel tasks. The MBR system 110 combines checkpoint data for multiple checkpoints from different tasks during task execution and loads the checkpoint data to resume tasks during recovery (e.g., after a crash or suspension of the process).

In a relational database system, the relational database system attempts to rollback transactions with the notion of a transaction log. As transactions are executed against a database, the transactions are written to a log, with multiple transactions in progress at any one time. If a crash occurs, the relational database system uses the log to perform a rollback to get the database back to a consistent point. However, a long running process (e.g., a migration process) may perform updates to the relational database data, as well as, non-database data, such as files. In such cases, if a crash occurs, the relational database system rolls back updates to the database itself, but tasks for the long running process re do the work that the tasks were doing at the time of the crash. This may include creating, changing, and/or deleting files. However, the MBR system 110 enables the tasks to be restarted so that the tasks can then recover to where the tasks left off (to avoid redoing work). Moreover, the MBR system 110 enables multiple tasks running in parallel to each have a different recovery point.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, an application specific integrated circuit (ASIC), a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 5:
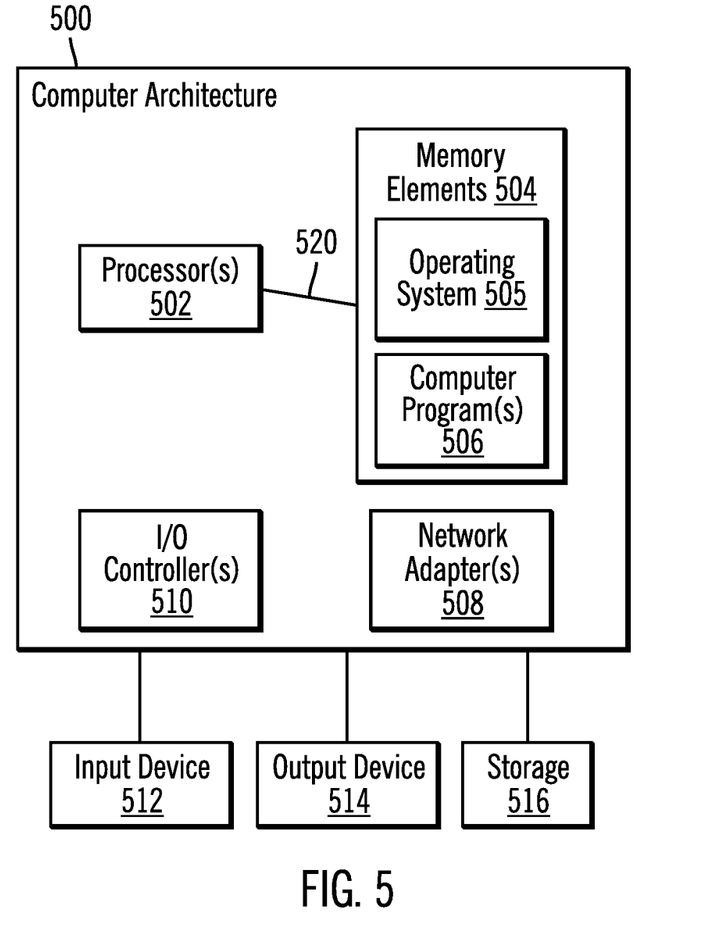
FIG. 5 illustrates, in a block diagram, a computer architecture that may be used in accordance with certain embodiments.

FIG. 5 illustrates a computer architecture 500 that may be used in accordance with certain embodiments. In certain embodiments, computing device 100 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., any type of storage device; a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   for a first task for a process that is executing multiple first actions, in response to determining that a first action from the multiple first actions has finished,
      determining whether the first action that finished is long running; and
      in response to determining that the first action that finished is long running, storing first checkpoint data from the first task to establish a first restart point at a first time;
   for a second task for the process that is executing multiple second actions and is executing in parallel with the first task, in response to determining that a second action from the multiple second actions has finished,
      determining whether the second action that finished is long running; and
      in response to determining that the second action that finished is long running, storing second checkpoint data from the second task to establish a second restart point at a second time;
   merging the first checkpoint data and the second checkpoint data to create a checkpoint file; and
   in response to restarting the process, restarting the first task at the first restart point and the second task at the second restart point using the checkpoint file.

2. The method of claim 1, further comprising:
   storing different checkpoint data for multiple checkpoints for the first task, wherein the first task is restarted with the checkpoint data at a last generated checkpoint from the multiple checkpoints.

3. The method of claim 1, further comprising:
   receiving a task configuration file; and
   creating a task save area for the first task and a task save area for the second task identified in the task configuration file, wherein the checkpoint data for the first task is stored in the task save area for the first task and second checkpoint data for the second task is stored in a task save area for the second task.

4. The method of claim 1, wherein the checkpoint file is stored in a file system.

5. The method of claim 1, further comprising:
   creating a task object for the first task that is an internal representation of the first task.

6. The method of claim 1, wherein the process is a long-running process comprising one of a migration operation, a backup operation, a restore operation, and an Extract Transform Load (ETL) process.

7. The method of claim 1, wherein the first checkpoint data includes a project name, a last job processed identifier, an application name, a database name, a database table name, and a database driver path.

8. The method of claim 1, wherein the first task determines when to create additional checkpoints based on individual needs of that first task.

* * * * *